No. 739,413. PATENTED SEPT. 22, 1903.
J. HANDEL.
WIND OR WATER WHEEL.
APPLICATION FILED MAY 16, 1903.
NO MODEL.
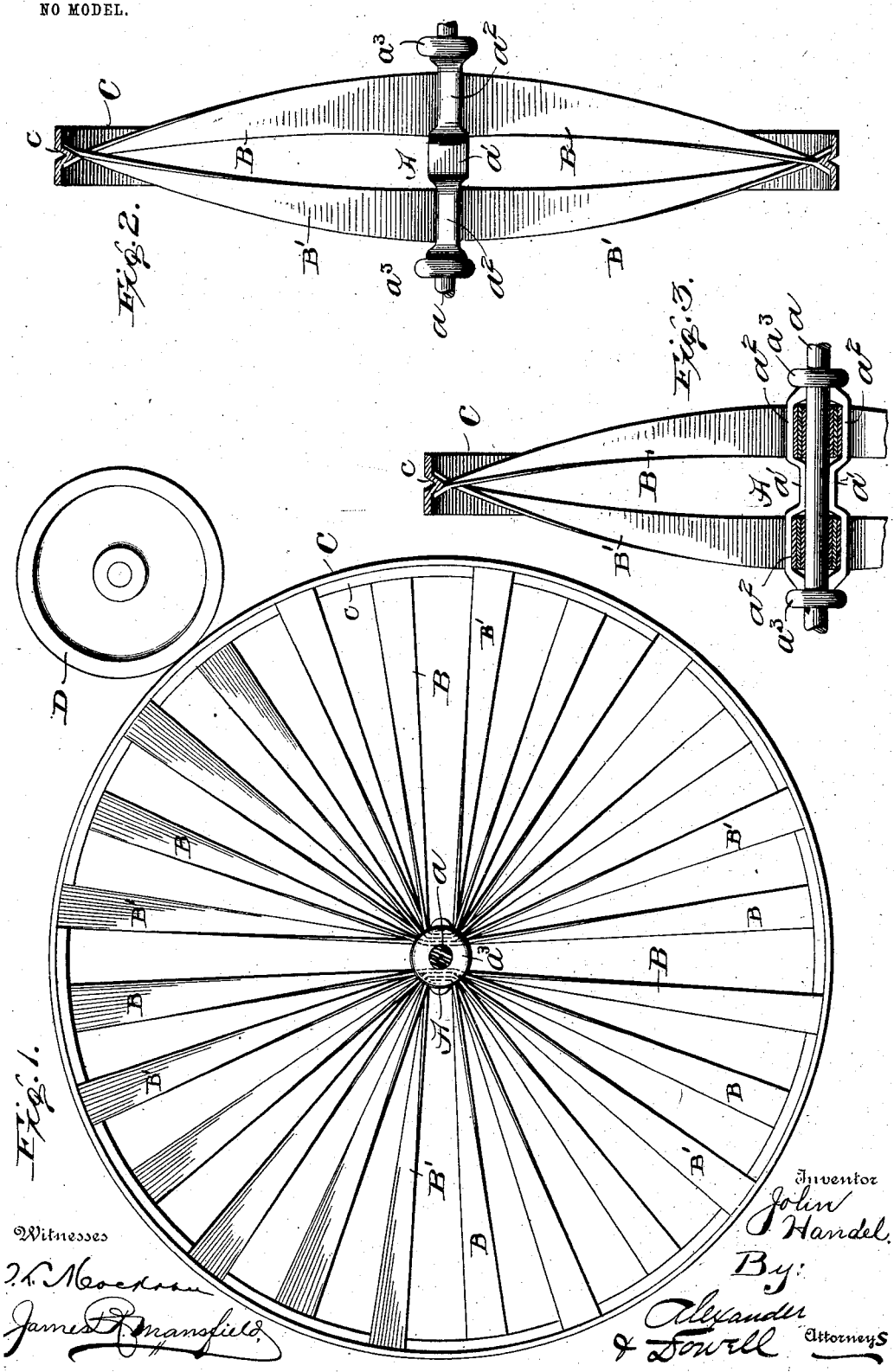

No. 739,413. Patented September 22, 1903.

UNITED STATES PATENT OFFICE.

JOHN HANDEL, OF SAVANNA, ILLINOIS.

WIND OR WATER WHEEL.

SPECIFICATION forming part of Letters Patent No. 739,413, dated September 22, 1903.

Application filed May 16, 1903. Serial No. 157,450. (No model.)

*To all whom it may concern:*

Be it known that I, JOHN HANDEL, of Savanna, in the county of Carroll and State of Illinois, have invented certain new and useful Improvements in Wind or Water Wheels; and I hereby declare that the following is a full, clear, and exact description thereof, reference being had to the accompanying drawings, which form part of this specification.

This invention is an improvement in wind and water wheels adapted to act as motors for transmitting power derived from air or water currents, or if the wheel be driven by other power it can be used to create currents of air or water. The invention, however, is primarily designed as a motor-wheel to be driven by air-currents. The wheel has two sets of blades or vanes spread some distance apart at their points of attachment to the axle or hub, but coming into line near or at the rim of the wheel, the inner ends of the blades at the hub being alined with the shaft and with each other; but the outer ends of the blades in the two series are twisted so as to aline with the plane of the wheel-rim, the blades being given substantially a quarter-turn between the shaft and rim, and the outer ends of the blades in the two series alternate at the rim to which they are attached.

An important feature of the invention is that the blades in both sets are twisted in the same direction, their inner ends being broadside parallel with the hub or axis, but the leverage of the blades decreases from the hub toward the rim in proportion to the speed of different parts of the blade around the hub during rotation of the wheel.

A minor object is to provide a simple and economical wheel structure.

The wheel illustrated in the drawings embodies the several features of the invention; but I do not limit myself to the construction shown except as the same may be specifically stated in the claims, to which I refer for summaries of the essential features and constructions of parts of the invention for which protection is desired.

In the drawings, Figure 1 is a broadside view of the wheel. Fig. 2 is a vertical central section thereof, showing the shaft in full lines. Fig. 3 is a detail section similar to Fig. 2, but in a plane at right angles to that of Fig. 2.

To the hub or shaft $a$ of the wheel are connected two series of blades or vanes B B', one set in advance of the other and with their broadsides or longest diameters at their inner ends parallel with the axis of the shaft and the blades in each set at their ends adjacent to the shaft being in alinement when viewed from the side, so that every pair of front and rear blades appear to converge and merge at the hub, but diverge as they radiate outward. The outer ends of the blades in each set converge toward each other and meet at the rim to which they are attached, preferably by fastening their outer ends to opposite sides of a rib $c$ on the rim, as shown. The blades are given a quarter-turn or less between the shaft and rim, so that their outer ends are substantially broadside in the plane of the wheel and edgewise to the rotative movement thereof, while their inner ends are edgewise to the plane of the wheel and broadside to the plane of revolution.

A simple and cheap wheel can be made, as shown in the drawings, by making the vanes or blades out of long strips of suitable material, the centers of the strips being fast to the shaft in any suitable way, as shown, by being passed under a loop $a^2$ in a bar $a'$, secured to the shaft by collars $a^3$, and the outer ends of the strip being properly twisted and fastened to the rim, as shown. Enough strips to form blades for half, more or less, of the wheel can be secured beneath each clamp, and two clamps are shown each confining two sets of strips, forming blades for opposite halves of the wheel. This construction enables a large wheel to be easily made up in sections, and it also facilitates the removal and replacing of broken or damaged blades or vanes.

Power may be taken from or applied to the wheel either through shaft $a$ or through the rim of the wheel by belting or gearing. I have shown a friction-pulley D in engagement with the periphery of rim C. The wheel shown in Fig. 1 will give or receive two long impulses owing to the nesting of the blades.

The advantages of my wheel are that it is self-braced against end thrust by reason of the oppositely-inclined sets of blades B B'. The blades in both sets being twisted alike renders the wheel reversible—i. e., it can receive motion from either side and propel forward or back—and the currents of air passing through the wheel act alike on both sets of blades to impart motion in the same direction to the wheel. The wheel is especially adapted for use as a portable wind-wheel, which must operate near the surface of the ground, as it responds readily to changeable and slow-moving currents of air.

Having thus described my invention, what I therefore claim as new, and desire to secure by Letters Patent thereon, is—

1. A wheel having a hub or shaft, a rim, two sets of blades attached to the hub and rim, the sets of blades being separated at the hub, but converging toward the rim, and the outer ends of the blades alternating in their points of attachment to the rim, the blades being given a twist between the hub and rim and both sets of blades being twisted in the same direction, substantially as described.

2. A wheel having a hub, a rim and two sets of blades, the inner ends of the sets of blades being separated at the hub, but in alinement with the shaft, the sets of blades converging toward the rim and their outer ends alternating in their points of attachment thereto, the blades in both sets being twisted in the same direction, for the purpose and substantially as described.

3. In a wheel of the character described, a rim, a shaft or hub, two series of blades attached to the hub edgewise to the face of the wheel, and converging toward the rim, and attached thereto substantially broadside to the face of the wheel, both sets of blades being twisted or deflected in the same direction, for the purpose and substantially as described.

4. In a wheel of the character described, a rim, a shaft or hub, two series of blades attached to the hub edgewise to the face of the wheel, and converging toward the rim, and attached thereto substantially broadside to the face of the wheel, the front and rear blades being in alinement at the hub but alternating at the rim.

5. In a wheel, the combination of the rim and hub, a strip having its center attached to the hub, and its extremities attached to the rim, and forming vanes or blades, the said blades being twisted in the same direction, substantially as described.

6. A wheel comprising a rim, a hub and series of strips attached to the hub, and having their outer ends radiating toward and attached to the rim, and forming the blades or vanes thereof, the blades being twisted or deflected in similar directions, substantially as described.

7. A wind-wheel comprising a rim, a shaft or hub, two series of blades attached to the hub edgewise to the face of the wheel, and converging toward the rim, and attached thereto substantially broadside to the face of the wheel, the front and rear blades being in alinement at the hub, but alternating at the rim, and both sets of blades being twisted or deflected in the same direction, for the purpose and substantially as described.

In testimony that I claim the foregoing as my own I affix my signature in presence of two witnesses.

JOHN HANDEL.

In presence of—
  NELLIE HOLLAND,
  FRANK S. GREENLEAF.